(12) United States Patent
Trifunovic

(10) Patent No.: US 10,437,868 B2
(45) Date of Patent: Oct. 8, 2019

(54) PROVIDING IMAGES FOR SEARCH QUERIES

(71) Applicant: Microsoft Technology Licensing, LLC, Redmond, WA (US)

(72) Inventor: Nikola Trifunovic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 695 days.

(21) Appl. No.: 15/061,629

(22) Filed: Mar. 4, 2016

(65) Prior Publication Data

US 2017/0255693 A1 Sep. 7, 2017

(51) Int. Cl.
- G06F 16/33 (2019.01)
- G06F 16/51 (2019.01)
- G06F 16/58 (2019.01)
- G06F 16/907 (2019.01)

(52) U.S. Cl.
CPC ............ *G06F 16/334* (2019.01); *G06F 16/51* (2019.01); *G06F 16/58* (2019.01); *G06F 16/5866* (2019.01); *G06F 16/907* (2019.01)

(58) Field of Classification Search
None
See application file for complete search history.

(56) References Cited

U.S. PATENT DOCUMENTS

| | | |
|---|---|---|
| 7,526,481 B1 | 4/2009 | Cusson et al. |
| 7,769,746 B2 | 8/2010 | Lu et al. |
| 8,150,843 B2 | 4/2012 | Chitiveli et al. |
| 8,171,043 B2 | 5/2012 | Murdock et al. |
| 8,782,029 B1 | 7/2014 | Yee et al. |
| 8,983,939 B1 | 3/2015 | Wang et al. |
| 2009/0290812 A1 | 11/2009 | Naaman et al. |
| 2009/0313239 A1 | 12/2009 | Wen et al. |
| 2011/0184936 A1 | 7/2011 | Lymberopoulos et al. |

(Continued)

OTHER PUBLICATIONS

Wu, et al., "Learning to Personalize Trending Image Search Suggestion", In Proceedings of the 37th international ACM SIGIR conference on Research & development in information retrieval, Jul. 6, 2014, pp. 727-736.

(Continued)

*Primary Examiner* — Wilson Lee
(74) *Attorney, Agent, or Firm* — Jeffrey L. Ranck; Ranck IP Law

(57) ABSTRACT

Techniques and technologies for providing images for search queries are described. In at least some embodiments, a system includes a scraping query component, a search component, and a search results analysis component. The scraping query component provides a scrape query based on textual information associated with an entity of interest. The search component conducts an electronic search via one or more networks to obtain search results based at least partially on the scrape query, the search results including at least a search result image and image metadata associated with the search result image. The search results analysis component determines a similarity between at least part of the image metadata associated with the search result image and at least part of the textual information associated with the entity of interest, and determines whether to store, provide, or discard the search result image based at least partially on the determined similarity.

20 Claims, 7 Drawing Sheets

(56) References Cited

U.S. PATENT DOCUMENTS

| | | |
|---|---|---|
| 2011/0202543 A1 | 8/2011 | Chin et al. |
| 2011/0225192 A1 | 9/2011 | Imig et al. |
| 2012/0158784 A1 | 6/2012 | Bluvband et al. |
| 2012/0246135 A1 | 9/2012 | Bennett |
| 2012/0310914 A1 | 12/2012 | Khan |
| 2014/0363075 A1 | 12/2014 | Li et al. |
| 2015/0154229 A1* | 6/2015 | An ............... G06F 17/30247 707/728 |
| 2015/0178786 A1* | 6/2015 | Claessens ......... G06Q 30/0269 705/14.66 |
| 2015/0379013 A1 | 12/2015 | Purcell et al. |
| 2016/0042252 A1* | 2/2016 | Sawhney ......... G06F 17/30244 382/190 |
| 2017/0300372 A1* | 10/2017 | Andreopoulos ....... G06F 21/54 |
| 2018/0307706 A1* | 10/2018 | Xiao ..................... G06F 17/30 |

OTHER PUBLICATIONS

Falchi, et al., "Caching Content-based Queries for Robust and Efficient Image Retrieval", In Proceedings of the 12th International Conference on Extending Database Technology: Advances in Database Technology, Mar. 24, 2009, pp. 780-790.

Kashyap, et al., "Robust Semantic Text Similarity using LSA, Machine Learning, and Linguistic Resources", In Proceedings of Computers and the Humanities, Springer, vol. 50, Issue 1, Oct. 30, 2015, 37 Pages.

"International Search Report and Written Opinion Issued in PCT Application No. PCT/US17/019583", dated Apr. 19, 2017, 13 Pages.

* cited by examiner

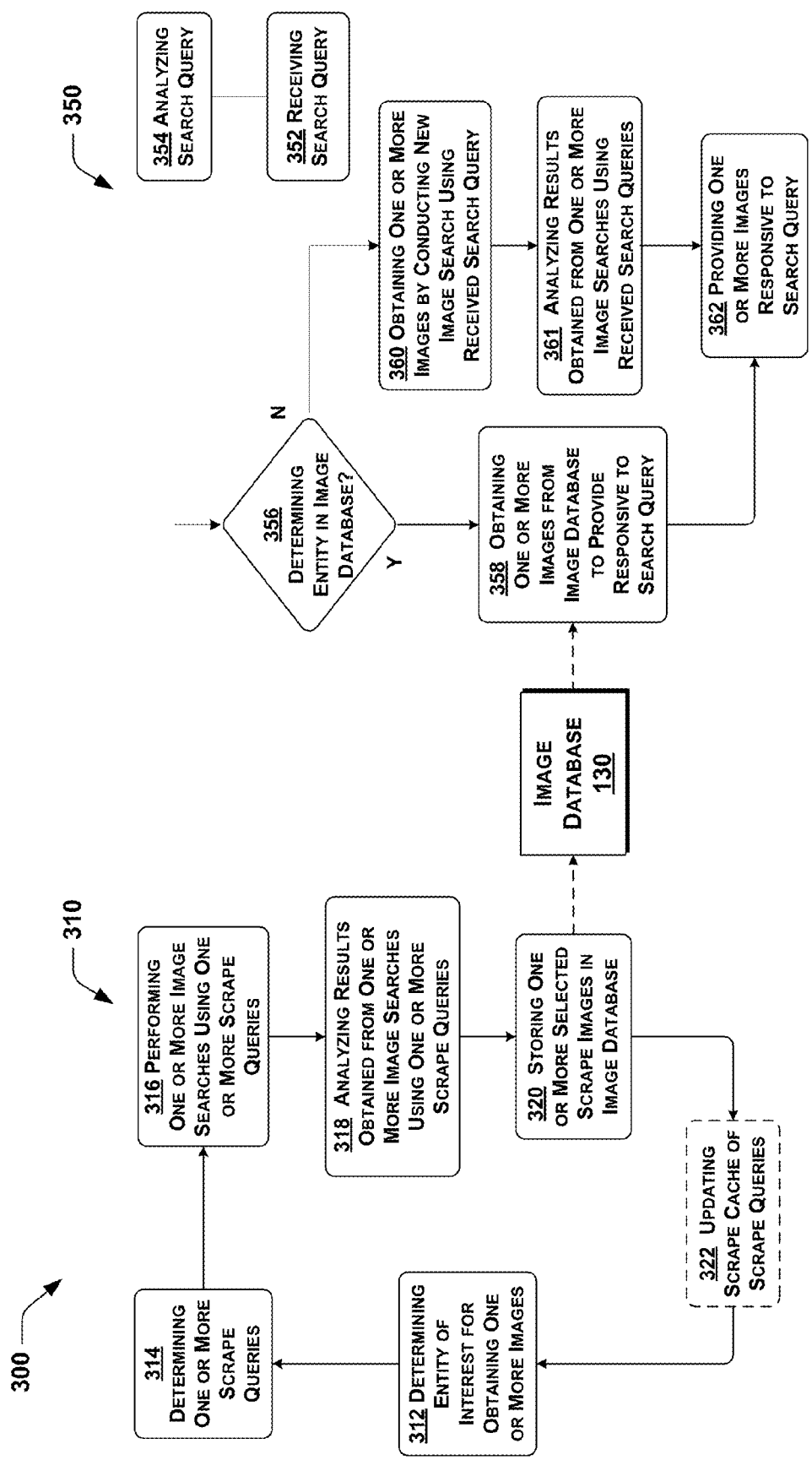

400 ⟶

```
<ScrapeConfig>                                                    ⟵ 410

<Fields>
 <Field name="Name"    xpath="NameGroup/EntityName" />
 <Field name="City"    xpath="Address/City" />
 <Field name="Address" xpath="Address/AddressLine" />
 <Field name="Website" xpath="PrimaryWebsiteGroup/PrimaryWebsite" />      ⟵ 420
 <Field name="Phone"   xpath="PrimaryPhoneGroup/PrimaryPhone" />
</Fields>

<Normalizer class="Microsoft.Local.Normalization,Microsoft.Local.Normalization.DefaultNormalizer">
 <Setting name="urlEncoding"   value="true" />
</Normalizer>
                                                                  ⟵ 430
<Queries market="en-US">
 <Query id="1"  format="{Name} {Address} {City}" />
 <Query id="2"  format="{Name} {City}" />
 <Query id="3"  format="{Name} (({Address}) OR ({City}) OR ({Phone}))" />
 <Query id="4"  format="site:{Website}" />
</Queries>

</ScrapeConfig>
```

502 ⟶
504 ⟶ bellagio 3600 las vegas blvd. south las vegas
506 ⟶ bellagio las vegas
508 ⟶ Bellagio ((3600 las vegas blvd. south)OR(70269371111))
       Site:http://www.bellagio.com/

Fig. 5

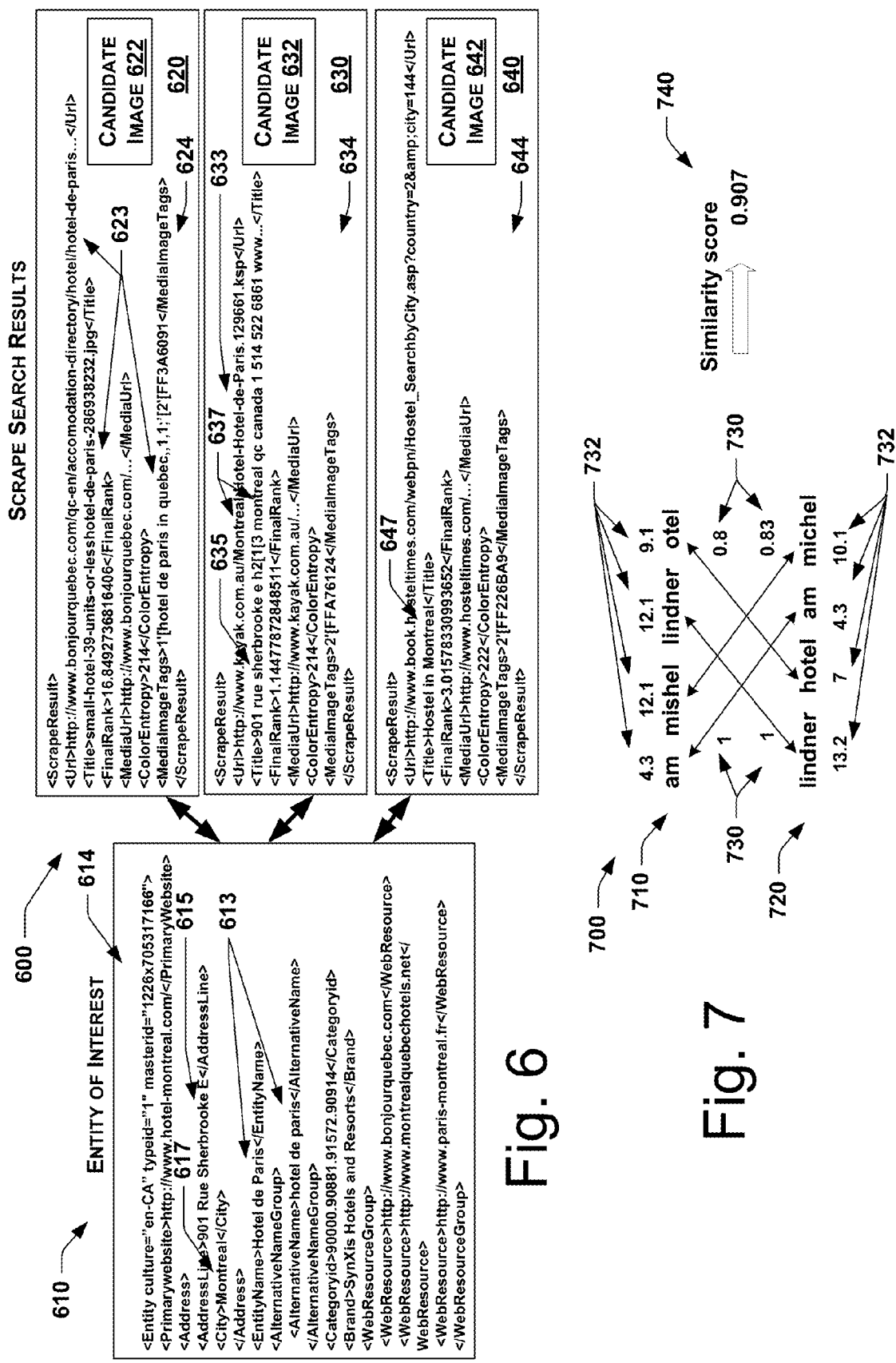

PROVIDING IMAGES FOR SEARCH QUERIES

BACKGROUND

Most users of electronic devices are familiar with search engines that enable a user to search for information via a network. Sometimes users employ search engines when seeking information related to businesses or other locations of interest (e.g. parks, monuments, etc.). For example, a user may wish to know about stores or restaurants in a particular area (e.g. near the user's current location). The user may enter a general query into a search engine seeking information about all such establishments, or alternately, the user may enter a more specific query to seek information about a specific establishment. In the information returned by the search engine, users often find visual images to be very informative and useful for making selections and for actually visiting an establishment.

Over time, some businesses may move or cease to operate while others may come into existence. Similarly, the appearance of businesses and other locations of interest may change. Such things as storefronts, signage, lighting, and natural landscapes may change and evolve, creating a need for more current, up-to-date images. Due to the ever-changing landscape of businesses and other locations of interest, providers of search results face substantial challenges associated with providing images that are current and that meet the needs of search queries in an efficient and effective manner.

SUMMARY

In at least some embodiments, a system for providing images for search queries includes a scraping query component configured to provide a scrape query based on textual information associated with an entity of interest; a search component configured to conduct an electronic search via one or more networks to obtain search results based at least partially on the scrape query, the search results including at least a search result image and image metadata associated with the search result image; and a search results analysis component configured to: determine a similarity between at least part of the image metadata associated with the search result image and at least part of the textual information associated with the entity of interest; and determine whether to store the search result image based at least partially on the determined similarity.

Similarly, in at least some implementations, a method for providing images for search queries, comprises: conducting an image search via one or more networks to obtain image search results, the image search results including at least a search result image and image metadata associated with the search result image; determining a similarity between the search result image and an entity of interest, including at least comparing one or more attributes of at least part of the image metadata with textual information associated with the entity of interest using a string distance function to determine an overall similarity score; and determining whether to store the search result image based at least partially on the overall similarity score.

Similarly, in at least some implementations, one or more computer-readable media bearing one or more instructions that, when executed by one or more processing components, perform operations for providing images for search queries, the operations comprising: obtaining one or more search results including at least a search result image and image metadata associated with the search result image; determining a similarity between at least part of the image metadata associated with the search result image and at least part of a textual information associated with an entity of interest, including at least comparing one or more attributes of at least part of the image metadata with one or more attributes of at least part of the textual information associated with the entity of interest using a string distance function to determine an overall similarity score; and determining whether to store the search result image based at least partially on the overall similarity score.

In at least some implementations, the comparing one or more attributes of at least part of the image metadata with one or more attributes of at least part of the textual information associated with the entity of interest using a string distance function to determine an overall similarity score comprises: separating at least part of the image metadata associated with the search result image into one or more first tokens; separating at least part of the textual information associated with the entity of interest into one or more second tokens; applying one or more first token weights to the one or more first tokens; applying one or more second token weights to the one or more second tokens; comparing at least some of the one or more first tokens with at least some of the one or more second tokens; computing a connection similarity score associated with each comparison of the one or more first tokens with the one or more second tokens; and computing the overall similarity score based at least partially on the one or more connection similarity scores, the one or more first token weights, and the one or more second token weights.

And in still other implementations, the operations may further comprise determining whether to compare at least some of the one or more first tokens with at least some of the one or more second tokens based on a specified edit distance function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

FIG. 3 shows an embodiment of a process for providing images for search queries.

FIG. 4 shows an embodiment of a scrape query template for generating scrape queries.

FIG. 5 shows an embodiment of a representative set of scrape queries for performing scrape image searches.

FIG. 6 shows an embodiment of a representative set of scrape search results for a representative entity of interest.

FIG. 7 shows an embodiment of a machine learning (ML) model comparison of two textual entities.

DETAILED DESCRIPTION

The present disclosure describes techniques and technologies for providing images for search queries. As described more fully below, techniques and technologies for providing images for search queries in accordance with the present disclosure may advantageously provide up-to-date images for search queries in an effective and efficient manner.

Figure 1:
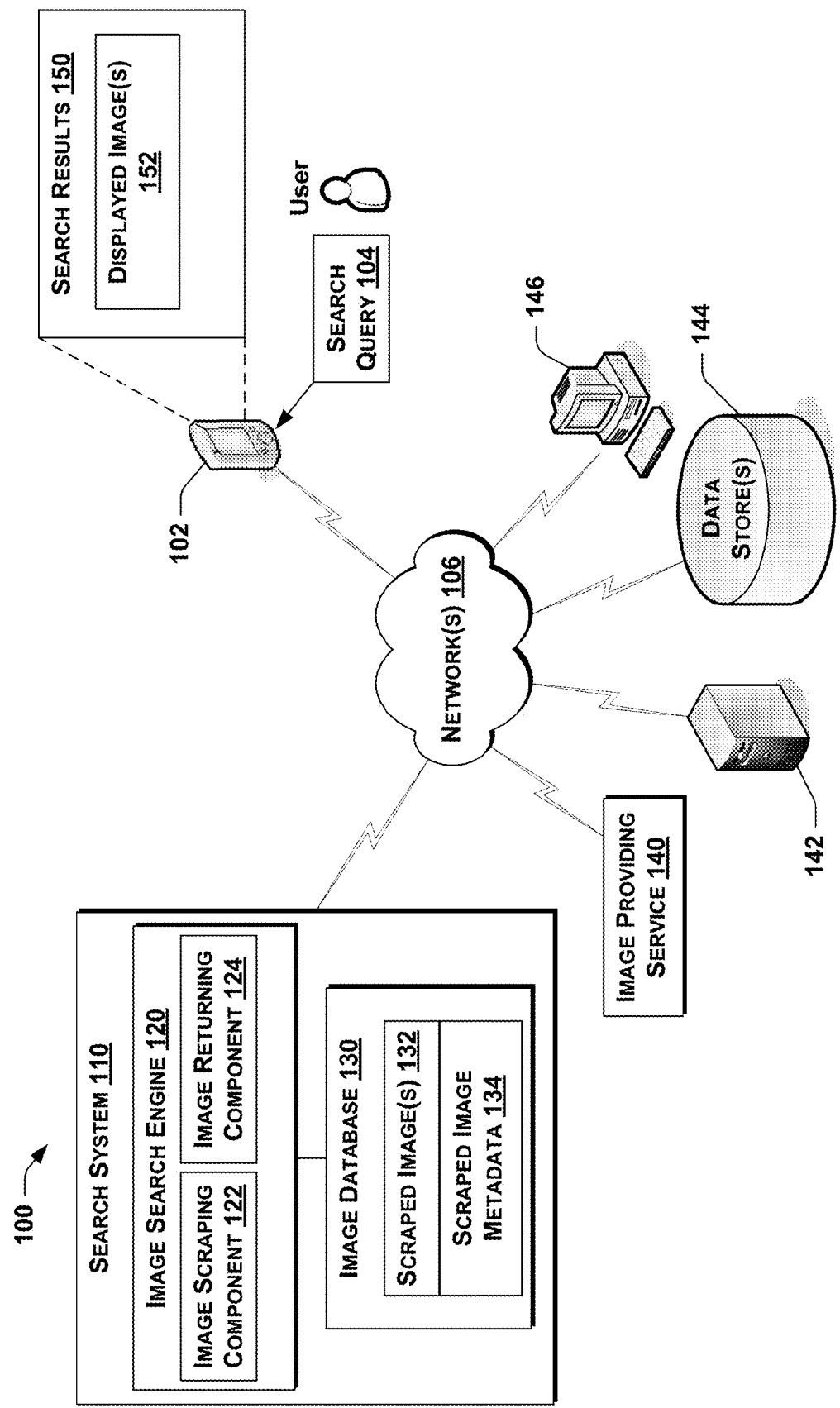
FIG. 1 shows an embodiment of an environment for providing images for search queries.

FIG. 1 shows an embodiment of an environment 100 for providing images for search queries in accordance with the present disclosure. In this embodiment, the environment 100 includes a search system 110 that operatively communicates with a user device 102 via one or more networks 106. The user device 102 may be any suitable device that enables a user to provide a search query 104 to the search system 110, and to receive and view search results 150 that include one or more displayed images 152.

In at least some implementations, the search system 110 may also communicate with other components or entities via the one or more networks 106. For example, as shown in FIG. 1, in at least some embodiments, the search system 110 may communicate via the one or more networks 106 with an image providing service 140 (e.g. Foursquare Labs, Inc. of New York, N.Y., Trip Advisor of Needham, Mass., etc.), a website host 142, one or more data stores 144, or an information source 146 (e.g. desktop computer, server or mainframe computer, laptop, notebook, cell phone, camera, imaging system, etc.).

The one or more networks 106 may comprise any suitable topology of servers, clients, Internet service providers, or other suitable communication media (e.g., a LAN, WAN, a local communication system, a global communication system, the Internet, a cellular communication system, a telephonic communication system, etc.). In various implementations, the one or more networks 106 may have a static or dynamic topology, and may include a secure network (e.g., an enterprise network), an unsecure network (e.g., a wireless open network, the Internet, etc.), and may also coordinate communication over other networks (e.g., PSTN, cellular networks, etc.). By way of example, and not limitation, the one or more networks 106 may be coupled by any suitable communication technologies, including, for example, electromagnetic signals, acoustic signals, RF signals, infrared signals and any other suitable communication technologies or signals.

It will be appreciated that the search system 110 shown in FIG. 1 may represent a variety of possible system types, including but not limited to a server, a mainframe, a workstation, a distributed computing system, a cloud-based computing system, or any other suitable type of system. Similarly, although the user device 102 is depicted in FIG. 1 as being a handheld device, such as a cellular telephone, it will be appreciated that in alternate embodiments, the user device 102 may be any suitable device that enables a user to provide the search query 104 to the search system 110, and to receive and view the search results 150 including the one or more displayed images 152. For example, in alternate embodiments, the user device 102 may be a Personal Data Assistant (PDA), notebook computer, tablet computer, laptop computer, desktop computer, server or mainframe computer, a television, a vehicle, an appliance, or any other suitable device.

In the implementation shown in FIG. 1, the search system 110 includes an image search engine 120 having an image scraping component 122 and an image returning component 124. The image search engine 120 communicates with an image database (or image cache) 130 that stores one or more scraped images 132 and associated scraped image metadata 134. Generally, in at least some implementations, the image scraping component 122 may perform image extraction (or scraping) by locating candidate images via the one or more networks 106, and storing the scraped images 132 within the image database 130, and the image returning component 124 may match relevant scraped images from the image database 130 with incoming search queries (e.g. search query 104) to provide the one or more search result images 152 within the search results 150 displayed at the user device 102.

Figure 2:
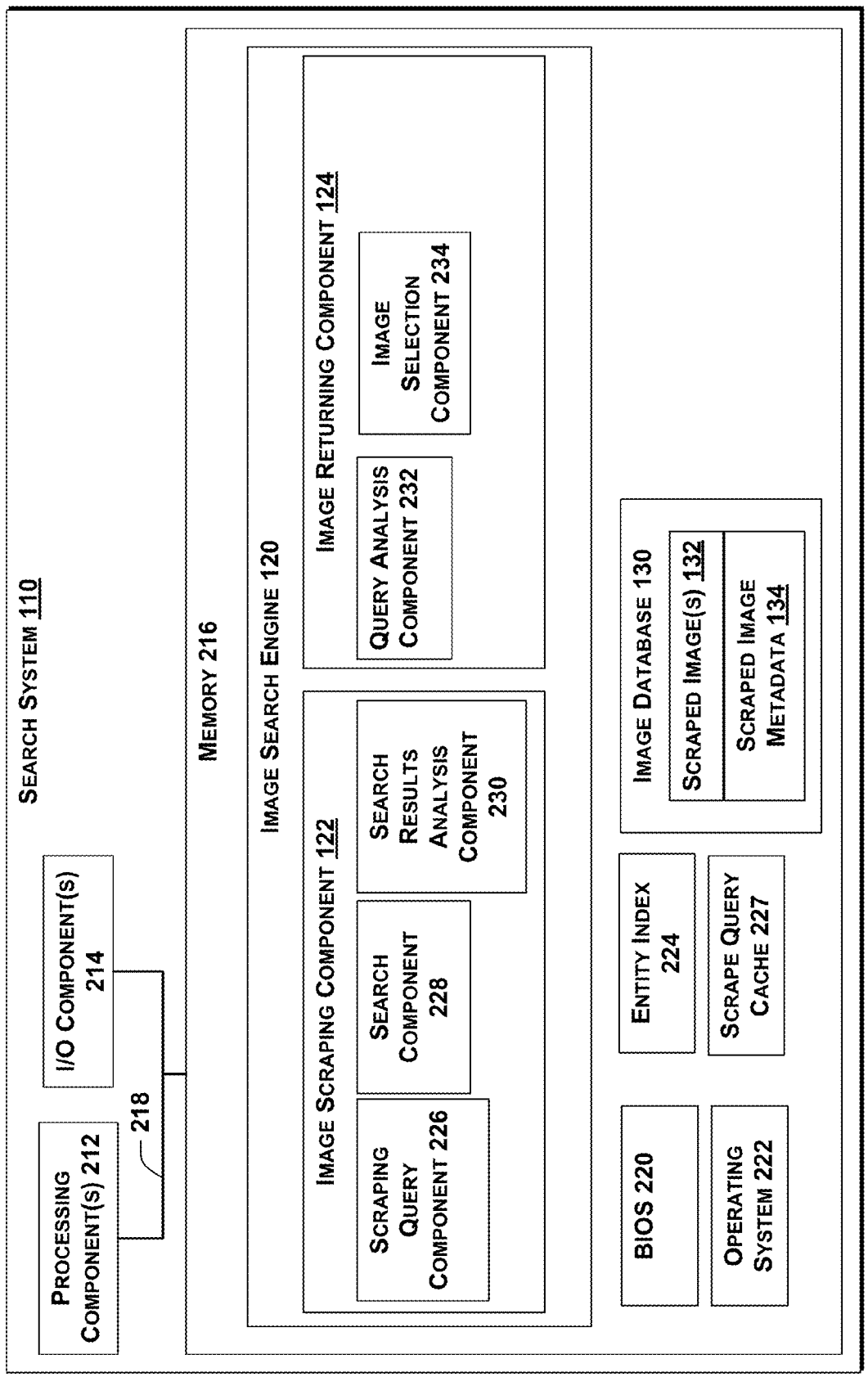
FIG. 2 shows an embodiment of a search system for providing images for search queries.

FIG. 2 shows additional details of an embodiment of the search system 110 for providing images for search queries of FIG. 1. In this embodiment, the search system 110 includes one or more processing components 212 and one or more input/output (I/O) components 214 coupled to a memory 216 by a bus 218. The memory 216 includes a basic input/output system (BIOS) 220 that provides basic routines that help to transfer information between elements within the system 110, and an operating system 222 that manages and provides common services to the various elements of the system 110. Also stored within the memory 216 is the image database 130 that includes the scraped images 132 and the scraped image metadata 134. In at least some implementations, an entity index 224 is also stored within the memory 216.

As further shown in FIG. 2, the image search engine 120 of the search system 110 is at least partially disposed in the memory 216. More specifically, the image search engine 120 may include instructions that, when executed by the one or more processing components 212, perform one or more operations for providing images for search queries in accordance with the present disclosure.

In at least some implementations, the image scraping component 122 of the image search engine 120 includes a scraping query component 226, a search component, 228, and a search results component 230. The scraping query component 226 obtains information regarding an entity of interest from the entity index 224, and provides one or more scraping search queries that may be used by the search component 228 to search for images associated with the entity of interest. In some implementations, the one or more scraping search queries may be obtained from a scrape query cache 227, or may be generated by the scraping query component 226 using one or more standard templates that are filled in with words, terms, phrases, partial words, word parts, syllables, numbers, sequences of numbers, or other data associated with the entity of interest obtained from the entity index 224.

In at least some implementations, the search component 228 receives the one or more scraping search queries provided by the scraping query component 226 and performs an online search for images associated with the entity of interest from the entity index 224. It will be appreciated that the search component 228 may search for images using a wide range of suitable techniques and technologies, including those employed by various known, publicly-available search engines (e.g. BING®, GOOGLE®, YAHOO®, BAIDU®, YANDEX®, etc.). More specifically, the search component 228 may communicate with other components or entities via the one or more networks 106, including but not limited to the image providing service 140, the website host 142, the one or more data stores 144, the information source 146, or any other suitable component or entity communicating via the one or more networks 106, to locate and obtain one or more search result images based on the one or more scraping search queries provided by the scraping query component 226.

In at least some implementations, the search results analysis component 230 analyzes the one or more search result images obtained by the search component 228 to determine which (if any) of the one or more search result images (along with associated metadata) are to be stored as scraped images 132 (and scraped image metadata 134) in the image database 130. For example, the search results analysis component 230 may merge the one or more search result images (e.g. to eliminate duplicates), and may individually compare each of the one or more search result images and associated image metadata with data associated with the entity of interest in order to filter and store the most relevant candidate scraped images 132 and scraped image metadata 134 within the image database 130. In at least some implementations, the search results analysis component 230 may use a machine learning (ML) approach to evaluate the content similarity between the scrape search results and the entity of interest from the entity index 224 for appropriate selection of one or more candidate images to be stored within the image database 130. Similarly, the search results analysis component 230 may determine which of the one or more search result images are to be discarded rather than being stored.

With continued reference to FIG. 2, in at least some implementations, the image returning component 124 includes a query analysis component 232 and an image selection component 234. The query analysis component 232 is configured to receive the search query 104 from the user device 102 and to analyze the search query 104 to match the search query 104 with one or more entities of interest from the entity index. In turn, the image selection component 234 receives information from the query analysis component 232 and selects one or more scraped images 132 from the image database 130 to return to the user device 102 for display within the search results 150 as the displayed images 152 corresponding to the search query 104. In at least some implementations, the query analysis component 232 or the image selection component 234 (or both) may use a machine learning (ML) approach to evaluate the content similarity between the search query 104 and the scraped image metadata 134 for appropriate selection of the one or more scraped images 132 to return to the user device 102 corresponding to the search query 104.

FIG. 3 shows an embodiment of a process 300 for providing images for search queries. In this embodiment, the process 300 includes a scraping pipeline portion 310, and an image returning portion 350. In at least some implementations, the scraping pipeline portion 310 includes determining an entity of interest for obtaining one or more images at 312. For example, in some implementations, the operations at 312 may include determining that a new entity has been added to the entity index 224, or alternately, the operations at 312 may include determining that one or more scraped images stored within the image database 130 have reached an age limit (or expired) such that it is desirable to conduct a search for possible new or more current images.

The scraping pipeline portion 310 further includes determining one or more scrape queries at 314. As noted above, in at least some implementations, the determining one or more scrape queries at 314 may include retrieving one or more previous scrape queries stored within the scrape query cache 227, or generating one or more new scrape queries (e.g. using one or more scrape query templates).

As further shown in FIG. 3, the scraping pipeline portion 310 further includes performing one or more image searches using the one or more scrape queries at 316. For example, in at least some implementations, the one or more image searches performed at 316 may include conducting one or more searches using a known, publicly-available image search engine. At 318, the scraping pipeline portion 310 includes analyzing the results obtained from the one or more image searches using the one or more scrape queries. In at least some implementations, the operations at 318 may include the search results analysis component 230 merging the one or more search result images (e.g. to eliminate duplicates), and comparing each of the one or more search result images and associated image metadata with data associated with the entity of interest in order to filter and store the most relevant candidate scraped images 132 and scraped image metadata 134 within the image database 130. As noted above, in at least some implementations, the search results analysis component 230 may use a machine learning (ML) approach to evaluate the content similarity between the scrape search results and the entity of interest from the entity index 224 for appropriate selection of one or more candidate images to be stored within the image database 130. In at least some implementations, the search results analysis component 230 discards one or more scrape search results for which the content similarity between the scrape search results and the entity of interest are not sufficient (e.g. content similarity does not meet or exceed a similarity threshold, does not have a sufficiently high similarity score, etc.).

The scraping pipeline portion 310 further includes storing one or more selected scrape images (and associated scrape image metadata) in the image database at 320. Optionally, the scraping pipeline portion 310 may further include updating the scrape cache of scrape queries 322, such as by storing any new scrape queries generated by the scrape query component at 314. In at least some implementations, the scraping pipeline portion 310 may then return to the operations at 312, and may repeat the above-noted operations 312 through 322 (e.g. periodically, non-periodically, conditionally, ad hoc, etc.) to build up the image database 130 to include a relatively current collection of scraped images 132 and associated scrape image metadata 134.

As further shown in FIG. 3, the image returning portion 350 includes receiving a search query at 352. For example, in at least some implementations, the search system 110 may receive the search query 104 from the user device 102 via the one or more networks 106. The image returning portion 350 further includes analyzing the search query at 354. In at least some implementations, the analyzing at 354 includes employing a machine learning (ML) matching function to determine a similarity between a requested entity contained within the search query and one or more scraped image metadata 134 stored within the image database 130 and assign a corresponding similarity score. Various possible aspects of the analyzing of the search query (at 354) are described more fully below.

The image returning portion 350 further includes determining whether one or more scraped images of the requested entity exist in the image database at 356. For example, in at least some implementations, the determining at 356 may be based on one or more similarity scores representing the similarly between the requested entity contained within the search query and one or more scraped image metadata determined at 354. If it is determined that one or more scraped images of the requested entity do exist within the image database (at 356), then the image returning portion 350 includes obtaining one or more images from the image database to provide responsive to the search query at 358, and providing the one or more images (from the image database) responsive to the search query at 362.

Alternately, if it is determined (at 356) that one or more scraped images of the requested entity do not exist within the image database, then the image returning portion 350 includes obtaining one or more images by conducting a new image search using the received search query (e.g. using BING®, GOOGLE®, YAHOO®, BAIDU®, YANDEX®, etc.) at 360, analyzing the results obtained from the one or more image searches using the received search query at 361, and providing the one or more images (from the new image search) responsive to the search query at 362. In at least some implementations, the analyzing at 361 may include one or more operations described above with respect to the analyzing results at 318 in the scraping pipeline portion 310 of the process 300, including using a machine learning (ML) approach to evaluate the content similarity between the search results and the entity of interest from the search query received at 352 for appropriate selection of one or more images, as described more fully below.

It will be appreciated that techniques and technologies for providing images for search queries may provide substantial operational improvements in comparison with conventional technologies. For example, processes for providing images for search queries that include a scraping pipeline portion (e.g. portion 310 of FIG. 3) may be managed in such a way that the computational workload associated with scraping operations may be controlled to provide improved matching with available system processing and bandwidth requirements. More specifically, such techniques can advantageously build and maintain an image database that may include rich images and complex textual structure in an automated, computationally efficient manner in comparison with conventional techniques and technologies.

By allowing updating of the entity index, and by automatically generating the scraping queries, the scraping pipeline portion enables automated and iterative image candidate repository enrichment by systematically building up the image database with scraped images and associated scape image metadata while not overloading the bandwidth of the scraping platform. One or more images may be located and stored in the image database for the entire entity index using background processing. In addition, techniques and technologies that include a scraping pipeline portion may advantageously support prioritization of desired markets and data segments (e.g. hotels and restaurants), and can be implemented in a wide variety of workflow environments that allow process scheduling (e.g. off-peak scheduling, etc.).

In addition to efficiency advantages, techniques and technologies for providing images for search queries in accordance with the present disclosure may also provide improved scalability, improved robustness, and improved quality over conventional technologies. More specifically, the scalability of the techniques and technologies may be improved by providing a generic matching model for analyzing and comparing the image scrape results with the scrape queries (at 318) for substantially all markets and market segments. Because the search systems and processes in accordance with the present disclosure may be componentized, the replacement or modification of components to provide for new or improved features may provide improved robustness over conventional technologies. In addition, the techniques and technologies in accordance with the present disclosure may provide for improved precision, thereby provides an improved, comprehensive image database that provides improved coverage for providing images for search results in comparison with conventional technologies.

Techniques and technologies for providing images for search queries in accordance with the present disclosure are not necessarily limited to the particular embodiments described above with reference to FIGS. 1-3. In the following description, additional embodiments of techniques and technologies for providing images for search queries will be described. It should be appreciated that the embodiments described herein are not intended to be exhaustive of all possible embodiments in accordance with the present disclosure, and that additional embodiments may be conceived based on the subject matter disclosed herein. For example, it should be appreciated that at least some of the various components and aspects of the described embodiments may be eliminated to create additional, or may be variously combined or re-ordered to create still further embodiments. In the following discussion of additional embodiments, common reference numerals may be used to refer to elements introduced above, and for the sake of brevity, descriptions of previously-introduced elements may be omitted so that emphasis can be properly placed on new or varying aspects of such additional embodiments.

As noted above, during the scraping pipeline portion 310 of the process 300 for providing images for search queries, the scraping query component 226 obtains information regarding an entity of interest from the entity index 224, and provides one or more scraping search queries that may be used by the search component 228 to search for images associated with the entity of interest. In at least some implementations, the one or more scraping queries may be obtained from one or more previous scrape queries stored within the scrape query cache 227, or may be generated by the scraping query component 226 using one or more standard templates using information associated with the entity of interest obtained from the entity index 224.

For example, FIG. 4 shows an embodiment of a scrape query template 400 for generating scrape queries. In this implementation, the scrape query template 400 includes a plurality of fields 410 (e.g. "Name", "City", "Address", "Website", "Phone") that are populated with information associated with an entity of interest contained within the entity index 224. The scrape query template 400 further includes a normalization identifier 420 that identifies a normalization protocol to be applied to the information contained within the plurality of fields 410 (e.g. remove capital letters, unnecessary spaces, unnecessary characters, encoded, etc.). The scrape query template 400 further includes a set of query identifiers 430 that define the format of the one or more scrape queries that will result from the scrape query template 400.

FIG. 5 shows an embodiment of a representative set of scrape queries 500 that may result from the scrape query template 400 of FIG. 4. The set of scrape queries 500 shown in FIG. 5 is representative of the one or more scrape queries that are determined by the scraping query component 226 (at 314), and that are used for performing one or more image searches using the search component 228 (at 316). In the embodiment shown in FIG. 5, the scrape queries 500 correspond to an entity of interest known as the "Bellagio" in Las Vegas, Nev. In this example, the representative set of scrape queries 500 includes a first scrape query 502 that includes the name and street address of the entity of interest (the "Bellagio"), a second scrape query 504 that includes the name and city of the entity of interest, a third scrape query 506 that includes the name and alternately the street address or the telephone number of the entity of interest, and a fourth scrape query 508 that includes a website associated with the entity of interest. The scrape queries 502-508 shown in FIG.

5 correspond to the query identifiers 430 of the scrape query template 400 of FIG. 4. Of course, the embodiments shown in FIGS. 4 and 5 are merely representative, and in alternate embodiments, other scrape query templates may be used that provide a wide variety of alternate scrape query configurations.

As noted above, the search results analysis component 230 analyzes the search results obtained by the search component 228 using the scrape queries from the scraping query component 226 to determine which (if any) of the one or more search result images (along with associated metadata) are to be stored as scraped images 132 (and scraped image metadata 134) in the image database 130, and which of the one or more search result images are to be discarded. The search results obtained by the search component 228 may include rich image responses in the form of complex textual structure. Different search engines may have different search schemas and formats (e.g. Extensible Markup Language (XML), JavaScript Object Notation (JSON), etc.). Typically, the search results provided by the search component 228 include images, as well as a rich set of metadata information and textual content which can be used for matching with entities of interest within the entity index 224.

For example, FIG. 6 shows an embodiment of a representative set of scrape search results 600 for a representative entity of interest 610, namely, the "Hotel de Paris" located in Montreal, Quebec. In at least some implementations, the entity of interest 610 may be characterized by entity metadata 614 obtained from the entity index 224. In the embodiment shown in FIG. 6, the representative set of scrape search results 600 includes a first search result 620 having a first candidate image 622 and associated first image metadata 624. Similarly, a second search result 630 includes a second candidate image 632 and associated second image metadata 634, and a third search result 640 includes a third candidate image 642 and associated third image metadata 644.

In operation, the search results analysis component 230 analyzes the scrape search results 600 (at 318) to determine whether to store one or more of the candidate images 622, 632, 642. In at least some implementations, the search results analysis component 230 assesses a similarity between the entity metadata 614 and the image metadata 624, 634, 644 associated with the candidate images 622, 632, 642 contained in the scrape search results 600. As noted above, in at least some implementations, the search results analysis component 230 may use a machine learning (ML) approach to evaluate the content similarity between the scrape search results 600 and the entity of interest 610. If sufficient similarity exists, the candidate image (and associated image metadata) is stored as a scraped image 132 (and associated scrape image metadata 134) within the image database 130.

For example, in at least some implementations, the analysis of the scrape search results 600 (at 318) may include one or more textual matching operations that may include determining one or more "EntityName" data 613 (e.g. "Hotel de Paris", "hotel de paris") associated with the entity of interest 610, and determining the presence or existence of one or more corresponding first name data 623 in the first search results 620, and second name data 633 in the second search results 630. In the embodiment shown in FIG. 6, the third search results 640 do not include any data in the third image metadata 644 that are similar to the one or more "EntityName" data 613 associated with the entity of interest 610. Similarly, in at least some implementations, the analysis of the scrape search results 600 (at 318) may include one or more textual matching operations that may include determining one or more "Address" data 615 (e.g. "901 Rue Sherbrooke E") associated with the entity of interest 610, and determining the presence or existence of one or more corresponding second address data 635 in the second search results 630. In the embodiment shown in FIG. 6, the first and third search results 620, 640 do not include any data in the first and third image metadata 624, 644 that are similar to the one or more "Address" data 615 associated with the entity of interest 610. In addition, in at least some implementations, the analysis of the scrape search results 600 (at 318) may include one or more textual matching operations that may include determining one or more "City" data 617 (e.g. "Montreal") associated with the entity of interest 610, and determining the presence or existence of one or more corresponding second city data 637 in the second search results 630, and one or more corresponding third city data 647 in the third search results 640. In the embodiment shown in FIG. 6, the first search results 620 do not include any data in the first image metadata 624 that are similar to the one or more "City" data 617 associated with the entity of interest 610. Based on the results of the analysis of the scrape search results 600 (at 318), the search results analysis component 230 may determine to store one or more of the first, second, and third candidate images 622, 632, 642 (and associated first, second, and third image metadata 624, 634, 644) into the image database 130.

As noted above, in at least some implementations, the search results analysis component 230 may use a machine learning (ML) model configured to learn and determine whether two textual entities are similar, and to provide a similarity score that indicates a degree of similarity between the two textual entities. The similarity score may be used by the search results analysis component 230 to determine whether to store, provide, or discard the images contained in or identified by the scrape search results 600. In at least some implementations, the ML model may have been trained and evaluated using one or more various techniques, including one or more of a classification learning model, a logistic regression, a Support Vector Machine (SVM), a neural net, or any other suitable training and evaluation techniques. The ML model may be configured to reach a desired degree of precision (e.g. 90%), and in some implementations, the ML model may be trained on a training set that contains entity and image response data.

It will be appreciated that the ML model may use a variety of features in the similarity model to determine whether two textual entities are similar, including for example, string similarities, search engine response scores (e.g. image static rank, image final rank, etc.), search engine filter attributes (e.g. people scores, adult scores, color entropy, etc.), entity category (e.g. hotel, restaurant, etc.), or any other suitable features. More specifically, in at least some implementations, the string similarities considered or determined by the ML model may include textual similarities between entity attributes and the image textual metadata, and textual similarities between entity attributes and a log or record associated with the search results (e.g. click log that indicates user selections or queries that led a user to the search result). In various implementations, the ML model may use one or more of various string distance functions (e.g. fuzzy, cosine, Levenshtein, simple containment binary feature, etc.), and in at least some implementations, the ML model may use different string distance functions depending upon what attributes are being compared. In at least some implementations, the ML model may use "Word2Vec" distances between strings, where Word2Vec is a publicly available tool for providing vector representations of words that takes a text corpus as input and produces a word vector as output. Similarly, in at least some implementations, the ML model may use Levenshtein string distance as a feature of the ML model. Thus, in at least some implementations, the machine learning model may be configured to determine similarity by applying a first string distance function when comparing a first attribute of the at least part of the image metadata associated with the search result image and at least part of the textual information associated with the entity of interest comprises, and by applying a second string distance function when comparing a second attribute of the at least part of the image metadata associated with the search result image and at least part of the textual information associated with the entity of interest.

More specifically, in at least some implementations, the search results analysis component 230 may use a distance-based machine learning (ML) model that counts how many additions and deletions (i.e. "edit counts") of individual letters are necessary to edit a first term to obtain a second term. In such a string distance computation, a lower number of counts means a better similarity. Such a string distance computation may be good for comparing individual words, where better similarity scores may be obtained for mis-spellings and plurals. For example, the distance-based ML model may compare the term "tree" with the term "trees," and assign an edit score of "1" since one addition of "s" at the end of the term "tree" is needed for a match. Similarly, the distance-based ML model may compare the term "tree" with the term "three," and assign an edit score of "1" since one addition of "h" is needed for a match. This demonstrates that relatively low edit scores, which means good similarity, may be obtained for completely different words. In yet a further example, the distance-based ML model may compare the phrase "new york city" with the term "city of new york," and assign an edit score of "15" determined by first deleting "new york" and then adding "of new york," which shows that such a distance-based ML model may result in a relatively bad score for phrases where word order is changed. Thus, in at least some implementations, the distance-based ML model may suffer from a word ordering problem, and may be improved by further including a token-based modeling aspect, as described more fully below.

For example, FIG. 7 shows an embodiment of a machine learning (ML) model comparison 700 of two textual entities (a first textual entity 710 and a second textual entity 720). The embodiment shown in FIG. 7 represents a "fuzzy" method that combines advantages of both "edit distance" methods and"token distance" methods. The first textual entity 710 may represent a search image metadata and the second textual entity 720 may represent an entity of interest metadata. As shown in FIG. 7, in at least some implementations, the first and second textual entities 710, 720 may be tokenized and each token of one textual entity compared with each token of the other textual entity. More specifically, an ML model may use a fuzzy string similarity approach to compare each token of one textual entity with each token of the other textual entity using a specified edit distance function (e.g. Levenshtein) forming a bipartite graph (e.g. FIG. 7) where connections are weighted with connection similarity scores 730. In at least some implementations, connections with connection similarity scores 730 below a specified threshold may be disconnected (or discarded, or disregarded), and the bipartite graph may be reduced keeping only 1-1 connections having connection similarity scores 730 that meet or exceed the specified threshold.

More specifically, in at least some implementations, the ML model may include one or more token-based (or tokenization) aspects that improve the word ordering problem noted above. For example, in at least some implementations, the score may be determined as a ratio of (number of common words) over a function f(number of words in phrase1, number of words in phrase2). Returning to the above-example involving a comparison of the phrase "New York city" with the term "city of New York," the number of common words is "3," the number of words in phrase1 is "3," and the number of words in phrase2 is "4." The resulting score may then be determined based on the function "f," for example, as follows: (1) if "f=min( )" then the similarity score equals "1", or (2) if "f=max( )" then the similarity score equals "0.75", etc.

It may be appreciated that an ML model that relies fully on tokenization aspects may not provide a desired accuracy for examples that involve mis-spellings or plural differences (e.g. "tree" compared with "trees" or "three"). Thus, in at least some implementations, the search results analysis component 230 may use a so-called "fuzzy" distance-based ML model that combined edit distance and token-based aspects to provide a similarity score that may realize improved scoring by obtaining advantages of both edit scoring aspects and token based aspects.

More specifically, in the previous example, each token was essentially assigned a token weight of "1." In at least some implementations, however, the ML model may assign token weights 732 (i.e. non-"1" token weights) to the various tokens of the first and second textual entities 710, 720 (e.g. higher weight for longer, more complex tokens), and may then apply a token-weighted cosine similarity function to determine an overall similarity score 740 for the similarity between the first and second textual entities 710, 720.

It will be appreciated that "token weights" may be used by string similarity functions to compute better similarity scores. In at least some implementations, Inverse Document Frequency (IDF) scores may be used. After similarity scores are computed, they may be used as features in the ML model. For example, in the process of training an ML model, each feature obtains its "feature weight".

It will be appreciated that implementations of ML models as described above may advantageously match textual entities having different declinations, which may improve robustness of the ML model for a variety of different languages in comparison with alternate ML models. In various implementations, the token weights may be determined based on a wide variety of similarities. For example, in some implementations, the token weights may be determined based on Inverse Document Frequency (IDF) token scores, which may help to ensure that matches on very common tokens may not have a big impact on the overall similarity score 740. In at least some implementations, containment features may be employed where various location attributes that are typically present (e.g. city) may be checked in various textual data (e.g. image name, image source page, image metadata, image page index content and queries, etc.).

For example, if phrase1 is "the apple corporation" and phrase2 is "the microsoft corporation," a purely token-based similarity score might be 2/3, which may represent an undesirably high score. However, in at least some implementations, the ML model could instead assign weights to each of the tokens. In at least some implementations, terms which are very frequently used may be considered to not provide much useful information, while rare words may be considered to provide a lot of useful information. In at least some implementations, inverse document frequency (IDF)

may be employed to assign token weights, and may be calculated as log(1/n). Thus, a word such as "the" which may appear frequently in an index could be assigned a relatively low IDF token weight of "2," while a relatively less common word such as "corporation" could be assigned an IDF token weight of "5." Similarly, relatively rare terms such as "microsoft" and "apple" may be assigned relatively high IDF token weights of "9" and "8," respectively. Thus, in this example, the similarity score could be determined as (2+5)/(2+5+8)=7/15.

In the previous example, the similarity score was determined using a simple mathematical combination of the token weights, however, in at least some implementations, the ML model may combine the token weights using a more complex mathematical formulation, such as a cosine formulation. More specifically, in at least some implementations, each word or term may be obtained with its associated context (e.g. text around it on webpages, Wikipedia, etc.), and using a vectorization algorithm, it may be transformed into a vector of double values. One of the properties of the resulting vector is that similar words may have a relatively high cosine similarity between them. Also, in at least some examples, it may be possible to sum vectors of all words in a phrase to obtain a global context, which may be performed for phrases, and comparisons can be done between them to assess similarity between phrases.

It will be appreciated that the ML model may use additional information in determining similarity scores. For example, in at least some implementations, a system may store information regarding websites in a database (or "retroindex") that stores such information as title, keywords, content, or other suitable information associated with the website. Thus, upon obtaining a source page of an image from a website, the ML model may use information in the retroindex, and may enrich an image entity response with information from the retroindex associated with the website. In at least some implementations, the ML model may provide improved similarity scores (e.g. for business entities) using information contained in the retroindex.

In at least some alternate implementations, a database may include a list of queries that one or more previous users have typed before they clicked on a webpage (e.g. created using a search engine or other suitable tool). In such implementations, the ML model may use information from one or more common queries in the database to enrich an image response (e.g. for matching with a business entity).

In at least some further implementations, an ML model may be further improved using ML training. For example, in at least some implementations, an ML model may learn representative or appropriate token weights to assign to words or phrase features based on one or more training sets. Based on the one or more training sets used to train the ML model, a relatively improved or optimal mathematical formula may be determined to provide similarity scores that appropriately identify matches and distinguish pairs provided in the one or more training sets (e.g. through trial and error, human intervention, etc.).

It will be appreciated that techniques and technologies for using machine learning models for providing images for search queries may provide substantial operational improvements in comparison with conventional technologies. For example, techniques and technologies that use ML models in accordance with the present disclosure may provide improved robustness for a variety of different languages in comparison with conventional techniques. In addition, having a standard ML model that may be used for a plurality of markets may advantageously result in faster improvement iterations and simplified deployment and maintenance efforts. If a particular language requires special treatment, in at least some implementations, such a language could be treated via language-specific normalization definitions, which may be implemented in the form of static rules applied to the ML model. In this way, techniques and technologies for using machine learning models for providing images for search queries as disclosed herein may advantageously require less computational resources, less power and resource consumption, and may provide improved operational efficiencies, in comparison with conventional technologies.

Techniques and technologies disclosed herein for providing images for search queries may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments (e.g. cloud-based computing systems) where tasks are performed by remote-processing devices that are linked through a communications network.

Figure 8:
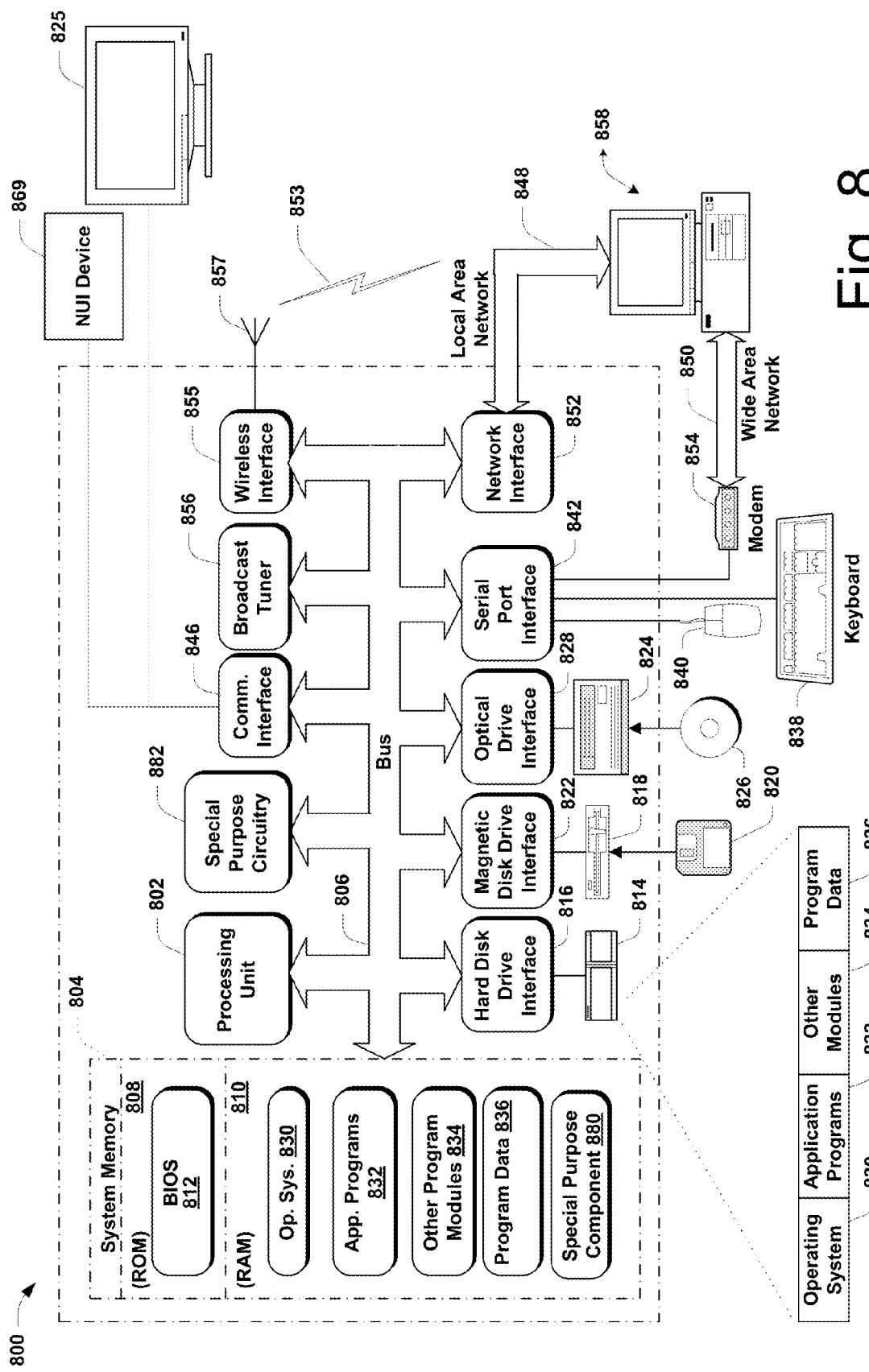
FIG. 8 shows an embodiment of a computer system for providing images for search queries.

Furthermore, techniques and technologies disclosed herein for providing images for search queries may be implemented on a wide variety of devices and platforms. For example, FIG. 8 shows an embodiment of a computer system 800 that may be employed for providing images for search queries. As shown in FIG. 8, the example computer system environment 800 includes one or more processors (or processing units) 802, special purpose circuitry 882, memory 804, and a bus 806 that operatively couples various system components, including the memory 804, to the one or more processors 802 and special purpose circuitry 882 (e.g., Application Specific Integrated Circuitry (ASIC), Field Programmable Gate Array (FPGA), etc.).

The bus 806 may represent one or more of any of several types of bus structures, including a memory bus or memory controller, a peripheral bus, an accelerated graphics port, and a processor or local bus using any of a variety of bus architectures. In at least some implementations, the memory 804 includes read only memory (ROM) 808 and random access memory (RAM) 810. A basic input/output system (BIOS) 812, containing the basic routines that help to transfer information between elements within the system 800, such as during start-up, is stored in ROM 808.

The example system environment 800 further includes a hard disk drive 814 for reading from and writing to a hard disk (not shown), and is connected to the bus 806 via a hard disk driver interface 816 (e.g., a SCSI, ATA, or other type of interface). A magnetic disk drive 818 for reading from and writing to a removable magnetic disk 820, is connected to the system bus 806 via a magnetic disk drive interface 822. Similarly, an optical disk drive 824 for reading from or writing to a removable optical disk 826 such as a CD ROM, DVD, or other optical media, connected to the bus 806 via an optical drive interface 828. The drives and their associated computer-readable media may provide nonvolatile storage of computer readable instructions, data structures, program modules and other data for the system environment 800. Although the system environment 800 described herein employs a hard disk, a removable magnetic disk 820 and a removable optical disk 826, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 800 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 8, a number of program modules may be stored on the memory 804 (e.g., the ROM 808 or the RAM 810) including an operating system 830, one or more application programs 832, other program modules 834, and program data 836 (e.g., the data store 820, image data, audio data, three dimensional object models, etc.). Alternately, these program modules may be stored on other computer-readable media, including the hard disk, the magnetic disk 820, or the optical disk 826. For purposes of illustration, programs and other executable program components, such as the operating system 830, are illustrated in FIG. 8 as discrete blocks, although it is recognized that such programs and components reside at various times in different storage components of the system environment 800, and may be executed by the processor(s) 802 or the special purpose circuitry 882 of the system environment 800.

A user may enter commands and information into the system environment 800 through input devices such as a keyboard 838 and a pointing device 840. Other input devices (not shown) may include a microphone, joystick, game pad, satellite dish, scanner, or the like. Still other input devices, such as a Natural User Interface (NUI) device 869, or user interface 825, include or involve one or more aspects of a Natural User Interface (NUI) that enables a user to interact with the system environment 800 in a "natural" manner, free from artificial constraints imposed by conventional input devices such as mice, keyboards, remote controls, and the like. For example, in at least some embodiments, the NUI device 869 may rely on speech recognition, touch and stylus recognition, one or more biometric inputs, gesture recognition both on screen and adjacent to the screen, air gestures, head and eye (or gaze) tracking, voice and speech, vision, touch, hover, gestures, machine intelligence, as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 802 and special purpose circuitry 882 through an interface 842 or a communication interface 846 (e.g. video adapter) that is coupled to the system bus 806. A user interface 825 (e.g., display, monitor, or any other user interface device) may be connected to the bus 806 via an interface, such as a video adapter 846. In addition, the system environment 800 may also include other peripheral output devices (not shown) such as speakers and printers.

The system environment 800 may operate in a networked environment using logical connections to one or more remote computers (or servers) 858. Such remote computers (or servers) 858 may be a personal computer, a server, a router, a network PC, a peer device or other common network node. The logical connections depicted in FIG. 8 include one or more of a local area network (LAN) 848 and a wide area network (WAN) 850. Such networking environments are commonplace in offices, enterprise-wide computer networks, intranets, and the Internet. In this embodiment, the system environment 800 also includes one or more broadcast tuners 856. The broadcast tuner 856 may receive broadcast signals directly (e.g., analog or digital cable transmissions fed directly into the tuner 856) or via a reception device (e.g., via an antenna 857, a satellite dish, etc.).

When used in a LAN networking environment, the system environment 800 may be connected to the local area network 848 through a network interface (or adapter) 852. When used in a WAN networking environment, the system environment 800 typically includes a modem 854 or other means (e.g., router) for establishing communications over the wide area network 850, such as the Internet. The modem 854, which may be internal or external, may be connected to the bus 806 via the serial port interface 842. Similarly, the system environment 800 may exchange (send or receive) wireless signals 853 with one or more remote devices using a wireless interface 855 coupled to a wireless communicator 857 (e.g., an antenna, a satellite dish, a transmitter, a receiver, a transceiver, a photoreceptor, a photodiode, an emitter, a receptor, etc.).

In a networked environment, program modules depicted relative to the system environment 800, or portions thereof, may be stored in the memory 804, or in a remote memory storage device. More specifically, as further shown in FIG. 8, a special purpose component 880 may be stored in the memory 804 of the system environment 800. The special purpose component 880 may be implemented using software, hardware, firmware, or any suitable combination thereof. In cooperation with the other components of the system environment 800, such as the processing unit 802 or the special purpose circuitry 882, the special purpose component 880 may be operable to perform one or more implementations of techniques for providing images for search queries as described above (e.g., example process 300 of FIG. 3 etc.).

Generally, application programs and program modules executed on the system environment 800 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

Figure 9:
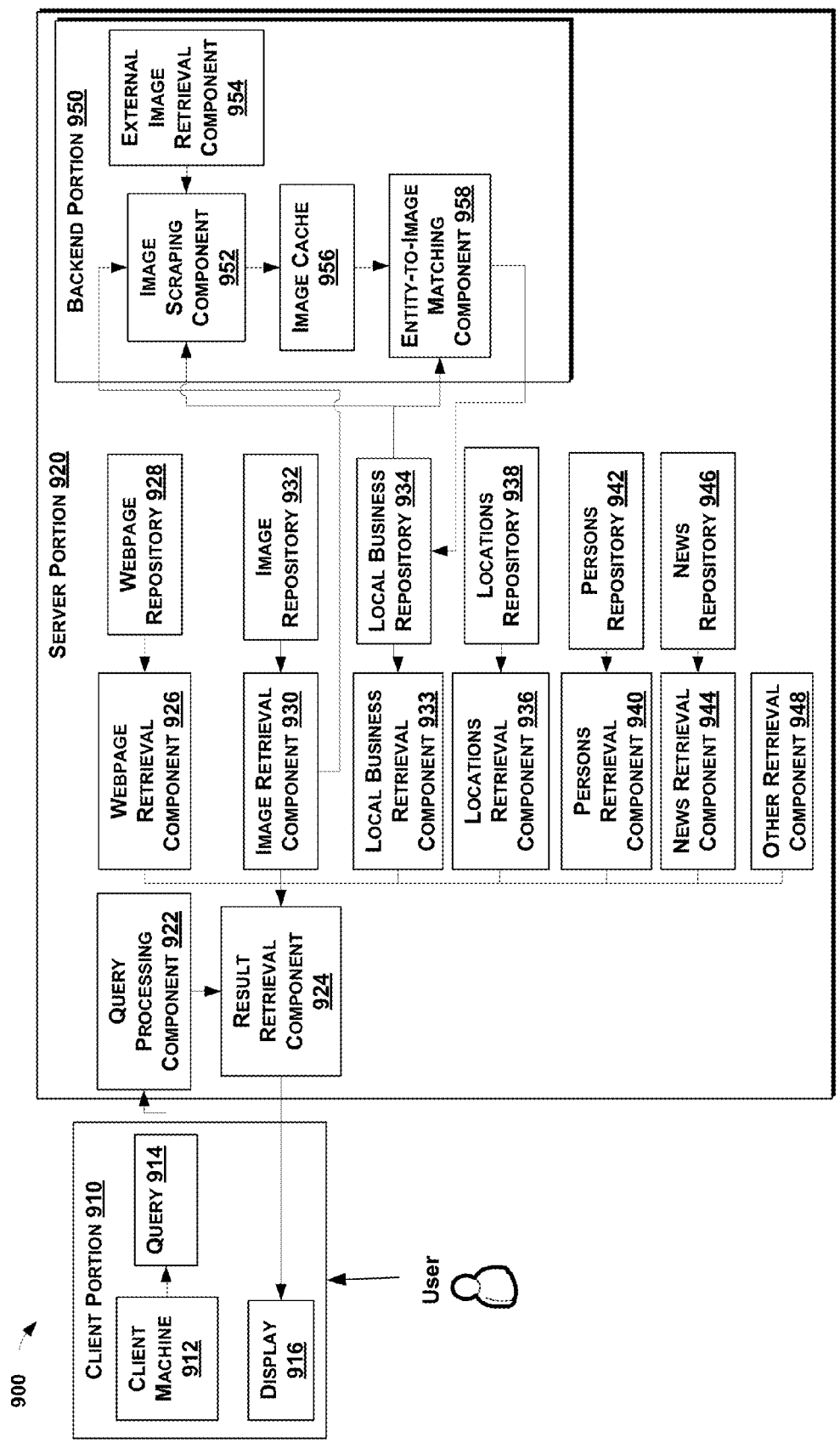
FIG. 9 shows another embodiment of an environment for providing images for search queries.

It will be appreciated that techniques and technologies for providing images for search queries disclosed herein are not limited to the particular embodiments described above, and that additional implementations may be conceived in accordance with the present disclosure. For example, FIG. 9 shows another embodiment of an environment 900 for providing images for search queries. In this embodiment, the environment 900 includes a user interacting with a client portion 910 that, in turn, interacts with a server portion 920.

More specifically, in the depicted embodiment, the client portion 910 includes a client machine 912 having a display 916. The client machine 912 receives a query 914 from the user and provides the query 914 to a query processing component 922 disposed on the server portion 920. The query processing component 922 processes the query 914 from the client portion 910, and provides resulting processed query to a result retrieval component 924. The result retrieval component 924 may draw one or more results from one or more various other components of the server portion 920 of the environment 900 depending upon the query 914. In at least some implementations, the query processing component 922 has a task to determine the intent of the raw user query 914. Depending on the resulting intent, one or more retrieval components are called. For example, a query "images of cats" could trigger only an image retrieval component 930, or a query "michael jordan" could trigger a webpage retrieval component 926 and a persons retrieval component 940, or a query "restaurant" could trigger the webpage retrieval component 926 and a local business retrieval component 933. Alternately, a query may contain a request type, such that a query written in "bing.com/images" may trigger only the image retrieval component 930.

For example, if the query 914 includes a webpage, then the result retrieval component 924 may receive one or more results from a webpage retrieval component 926. Similarly, if the query 914 includes an image request, then the result retrieval component 924 may receive one or more results from an image retrieval component 930. If the query 914 includes a local business request, then the result retrieval component 924 may receive one or more results from a local business retrieval component 933. In addition, if the query 914 includes a location request, then the result retrieval component 924 may receive one or more results from a locations retrieval component 936. Similarly, if the query 914 includes a person request, then the result retrieval component 924 may receive one or more results from a persons retrieval component 940. Further, if the query 914 includes a news request, then the result retrieval component 924 may receive one or more results from a news retrieval component 944. In addition, if the query 914 includes a request for other information, then the result retrieval component 924 may receive one or more results from an "other" retrieval component 948.

As further shown in FIG. 9, the server portion 920 may include various repositories of information from which the various retrieval components may obtain information to provide to the result retrieval component 924 in response to the query 914. For example, in the embodiment shown in FIG. 9, the webpage retrieval component 926 may obtain one or more results from a webpage repository 928, the image retrieval component 930 may obtain one or more results from an image repository 932, the local business retrieval component 933 may obtain one or more results from a local business repository 934, the locations retrieval component 936 may obtain one or more results from a locations repository 938, the persons retrieval component 940 may obtain one or more results from a persons repository 942, and the news retrieval component 944 may obtain one or more results from a news repository 946.

As further shown in FIG. 9, the server portion 920 further includes a backend portion 950 that may use one or more techniques and technologies described above (e.g. with respect to FIGS. 1-8) to provide images to the local business repository 934, where the source of the images may be the image retrieval component 930 or an external image retrieval component 954 (or both), to be returned in response to the query 914 for display to the user on the display 916 of the client machine 912. More specifically, the backend portion 950 includes a scraping component 952, an external image retrieval component 954, an image cache 956, and an entity-to-image matching component 958. In at least some implementations, the image retrieval component 930 may provide the query 914 (or the processed version of the query 914) to the image scraping component 952. The image scraping component 952 may receive one or more images from the external image retrieval component 954 (e.g. BING®, GOOGLE®, YAHOO®, BAIDU®, YANDEX®, etc.), or may access one or more images previously stored in the image cache 956. In at least some implementations, the entity-to-image component 958 may perform one or more operations described above with respect to analyzing search results, including using a machine learning (ML) approach to evaluate the content similarity between the search results and the entity of interest from the search query for appropriate selection of one or more images, as described more fully above. Accordingly, the entity-to-image component 958 determines one or more images to return to the local business repository 934, which in turn provides the one or more images to the result retrieval component 924 in response to the query 914. In further implementations, the entity-to-image component 958 of the backend portion 950 may provide the one or more images to any of the other components of the server portion 930 (e.g. the image repository 932, the local business repository 934, the locations repository, 938, the persons repository 942, the news repository 946, etc). Finally, as shown in FIG. 9, the result retrieval component 924 returns one or more results, including the one or more images provided by the image retrieval component 930, to the display 916 of the client machine 912.

In view of the disclosure of techniques and technologies for providing images for search queries as disclosed herein, a few representative embodiments are summarized below. It should be appreciated that the following summary of representative embodiments is not intended to be exhaustive of all possible embodiments, and that additional embodiments may be readily conceived from the disclosure of techniques and technologies for mapping user identifiers between different device ecosystems provided herein.

For example, in at least some embodiments, a system for providing images for search queries may include a scraping query component configured to provide a scrape query based on textual information associated with an entity of interest; a search component configured to conduct an electronic search via one or more networks to obtain search results based at least partially on the scrape query, the search results including at least a search result image and image metadata associated with the search result image; and a search results analysis component configured to: determine a similarity between at least part of the image metadata associated with the search result image and at least part of the textual information associated with the entity of interest; and determine whether to at least one of store, provide, or discard the search result image based at least partially on the determined similarity.

In at least some implementations, the scraping query component configured to provide a scrape query based on textual information associated with an entity of interest may include a scraping query component configured to: obtain textual information associated with an entity of interest from an entity index, and generate one or more scrape queries using one or more scrape query templates and the textual information associated with the entity of interest.

In further implementations, the search results analysis component configured to determine a similarity between at least part of the image metadata associated with the search result image and at least part of the textual information associated with the entity of interest may include a search results analysis component configured to apply a machine learning model to determine a similarity based on a similarity between at least part of the image metadata associated with the search result image and at least part of the textual information associated with the entity of interest.

In still further implementations, the machine learning model may be configured to determine the similarity by applying at least one of a fuzzy string distance function, a cosine string distance function, a Levenshtein string distance function, or a containment binary feature distance function.

In additional implementations, the machine learning model may be configured to determine the similarity by applying a first string distance function when comparing a first attribute of the at least part of the image metadata associated with the search result image and at least part of the textual information associated with the entity of interest comprises, and by applying a second string distance function when comparing a second attribute of the at least part of the image metadata associated with the search result image and at least part of the textual information associated with the entity of interest.

In other implementations, the search results analysis component configured to determine a similarity between at least part of the image metadata associated with the search result image and at least part of the textual information associated with the entity of interest may include a search results analysis component configured to determine a similarity score based on a similarity between at least part of the image metadata associated with the search result image and at least part of the textual information associated with the entity of interest.

In other implementations, the search results analysis component configured to determine a similarity between at least part of the image metadata associated with the search result image and at least part of the textual information associated with the entity of interest includes a search results analysis component configured to: tokenize the at least part of the image metadata associated with the search result image into one or more first tokens; tokenize the at least part of the textual information associated with the entity of interest into one or more second tokens; compare at least some of the one or more first tokens with at least some of the one or more second tokens; determine a connection similarity score associated with each comparison of the one or more first tokens with the one or more second tokens; and determine an overall similarity score based at least partially on the one or more connection similarity scores.

In at least some implementations, the search results analysis component configured to compare at least some of the one or more first tokens with at least some of the one or more second tokens may include a search results analysis component configured to compare at least some of the one or more first tokens with at least some of the one or more second tokens based on a specified edit distance function relationship between the at least some of the one or more first tokens and the at least some of the one or more second tokens.

In still further implementations, the search results analysis component configured to determine an overall similarity score based at least partially on the one or more connection similarity scores includes a search results analysis component configured to determine an overall similarity score by applying a token-weighted cosine similarity function to the one or more connection similarity scores.

In at least some implementations, the search results analysis component is further configured to disregard one or more connection similarity scores that do not meet or exceed a specified threshold. And in other implementations, the search results analysis component is further configured to: assign first token weights to the one or more first tokens and second token weights to the one or more second tokens; and wherein the overall similarity score is determined based at least partially on the one or more connection similarity scores and at least partially on the one or more first token weights and the one or more second token weights.

In additional implementations, the search results analysis component configured to determine an overall similarity score based at least partially on the one or more connection similarity scores and at least partially on the token weights includes a search results analysis component configured to determine an overall similarity score by applying a token-weighted cosine similarity function to the one or more connection similarity scores and the one or more first token weights and the one or more second token weights.

Similarly, in at least some implementations, a method for providing images for search queries, comprises: conducting an image search via one or more networks to obtain image search results, the image search results including at least a search result image and image metadata associated with the search result image; determining a similarity between the search result image and an entity of interest, including at least comparing one or more attributes of at least part of the image metadata with textual information associated with the entity of interest using a string distance function to determine an overall similarity score; and determining whether to at least one of store, provide, or discard the search result image based at least partially on the overall similarity score.

In at least some implementations, comparing one or more attributes of at least part of the image metadata with textual information associated with the entity of interest using a string distance function to determine an overall similarity score comprises: applying a first string distance function to compare a first attribute of at least part of the image metadata with textual information associated with the entity of interest; and applying a second string distance function to compare a second attribute of at least part of the image metadata with textual information associated with the entity of interest.

In still other implementations, comparing one or more attributes of at least part of the image metadata with textual information associated with the entity of interest using a string distance function to determine an overall similarity score comprises: tokenizing at least part of the image metadata associated with the search result image into one or more first tokens; tokenizing at least part of the textual information associated with the entity of interest into one or more second tokens; assigning one or more first token weights to the one or more first tokens; assigning one or more second token weights to the one or more second tokens; comparing at least some of the one or more first tokens with at least some of the one or more second tokens; determining a connection similarity score associated with each comparison of the one or more first tokens with the one or more second tokens; and determining the overall similarity score based at least partially on the one or more connection similarity scores, the one or more first token weights, and the one or more second token weights.

In still other implementations, comparing one or more attributes of at least part of the image metadata with textual information associated with the entity of interest using a string distance function to determine an overall similarity score further comprises: disregarding one or more connection similarity scores that do not meet or exceed a specified threshold.

And in still further implementations, comparing at least some of the one or more first tokens with at least some of the one or more second tokens comprises: determining whether to compare at least some of the one or more first tokens with at least some of the one or more second tokens based on a specified edit distance function.

In addition, in at least some implementations, a system for providing images for search queries includes: a query component configured to receive a search query, the search query including textual information associated with an entity of interest; an external image retrieval component configured to conduct a search for one or more images associated with the search query via one or more networks; a receiving component configured to receive a search result from the external image retrieval component, the search result including at least a search result image and image metadata associated with the search result image; and a search result analysis component. In at least some implementations, the search result analysis component is configured to: determine a similarity between at least part of the image metadata associated with the search result image and at least part of the textual information associated with the entity of interest; and determine whether to at least one of store, provide, or discard the search result image based at least partially on the determined similarity.

In further implementations, the search result analysis component configured to determine a similarity between at least part of the image metadata associated with the search result image and at least part of the textual information associated with the entity of interest may include a search result analysis component configured to compare one or more attributes of at least part of the image metadata with one or more attributes of at least part of the textual information associated with the entity of interest using a string distance function to determine an overall similarity score.

In still other implementations, the search result analysis component configured to compare one or more attributes of at least part of the image metadata with one or more attributes of at least part of the textual information associated with the entity of interest using a string distance function to determine an overall similarity score includes a search result analysis component configured to: separate at least part of the image metadata associated with the search result image into one or more first tokens; separate at least part of the textual information associated with the entity of interest into one or more second tokens; apply one or more first token weights to the one or more first tokens; apply one or more second token weights to the one or more second tokens; compare at least some of the one or more first tokens with at least some of the one or more second tokens; compute a connection similarity score associated with each comparison of the one or more first tokens with the one or more second tokens; and compute the overall similarity score based at least partially on the one or more connection similarity scores, the one or more first token weights, and the one or more second token weights.

Similarly, in at least some implementations, one or more computer-readable media bearing one or more instructions that, when executed by one or more processing components, perform operations for providing images for search queries, the operations comprising: obtaining one or more search results including at least a search result image and image metadata associated with the search result image; determining a similarity between at least part of the image metadata associated with the search result image and at least part of a textual information associated with an entity of interest, including at least comparing one or more attributes of at least part of the image metadata with one or more attributes of at least part of the textual information associated with the entity of interest using a string distance function to determine an overall similarity score; and determining whether to at least one of store, provide, or discard the search result image based at least partially on the overall similarity score.

In at least some implementations, the comparing one or more attributes of at least part of the image metadata with one or more attributes of at least part of the textual information associated with the entity of interest using a string distance function to determine an overall similarity score comprises: separating at least part of the image metadata associated with the search result image into one or more first tokens; separating at least part of the textual information associated with the entity of interest into one or more second tokens; applying one or more first token weights to the one or more first tokens; applying one or more second token weights to the one or more second tokens; comparing at least some of the one or more first tokens with at least some of the one or more second tokens; computing a connection similarity score associated with each comparison of the one or more first tokens with the one or more second tokens; and computing the overall similarity score based at least partially on the one or more connection similarity scores, the one or more first token weights, and the one or more second token weights.

And in still other implementations, the operations may further comprise determining whether to compare at least some of the one or more first tokens with at least some of the one or more second tokens based on a specified edit distance function.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system for providing images for search queries, comprising a processor and computer executable instructions that, when executed by the processor, implement:
    a scraping query component configured to provide a scrape query based on textual information associated with an entity of interest;
    a search component configured to conduct an electronic search via one or more networks to obtain search results based at least partially on the scrape query, the search results including at least a search result image and image metadata associated with the search result image; and
    a search results analysis component configured to:
        determine a similarity between at least part of the image metadata associated with the search result image and at least part of the textual information associated with the entity of interest, including at least:
            tokenize the at least part of the image metadata associated with the search result image into one or more first tokens;
            tokenize the at least part of the textual information associated with the entity of interest into one or more second tokens;
            compare at least some of the one or more first tokens with at least some of the one or more second tokens;
            determine a connection similarity score associated with each comparison of the one or more first tokens with the one or more second tokens; and
            determine an overall similarity score based at least partially on the one or more connection similarity scores; and
        determine whether to at least one of store, provide, or discard the search result image based at least partially on the determined similarity.

2. The system of claim 1, wherein the scraping query component configured to provide a scrape query based on textual information associated with an entity of interest comprises:
    a scraping query component configured to:
        obtain textual information associated with an entity of interest from an entity index, and
        generate one or more scrape queries using one or more scrape query templates and the textual information associated with the entity of interest.

3. The system of claim 1, wherein the search results analysis component configured to determine a similarity between at least part of the image metadata associated with the search result image and at least part of the textual information associated with the entity of interest comprises:
    a search results analysis component configured to apply a machine learning model to determine a similarity based on a similarity between at least part of the image metadata associated with the search result image and at least part of the textual information associated with the entity of interest.

4. The system of claim 3, wherein the machine learning model is configured to determine the similarity by applying at least one of a fuzzy string distance function, a cosine string distance function, a Levenshtein string distance function, or a containment binary feature distance function.

5. The system of claim 3, wherein the machine learning model is configured to determine the similarity by applying a first string distance function when comparing a first attribute of the at least part of the image metadata associated with the search result image and at least part of the textual information associated with the entity of interest comprises, and by applying a second string distance function when comparing a second attribute of the at least part of the image metadata associated with the search result image and at least part of the textual information associated with the entity of interest.

6. The system of claim 1, wherein the search results analysis component configured to determine a similarity between at least part of the image metadata associated with the search result image and at least part of the textual information associated with the entity of interest comprises:
    a search results analysis component configured to determine a similarity score based on a similarity between at least part of the image metadata associated with the search result image and at least part of the textual information associated with the entity of interest.

7. The system of claim 1, wherein the search results analysis component configured to determine a similarity between at least part of the image metadata associated with the search result image and at least part of the textual information associated with the entity of interest comprises:
a search results analysis component configured to apply a fuzzy distance-based machine learning model that determines a connection similarity score based on a combination of one or more edit distance aspects and one or more token-based aspects.

8. The system of claim 1, wherein the search results analysis component configured to compare at least some of the one or more first tokens with at least some of the one or more second tokens comprises:
a search results analysis component configured to compare at least some of the one or more first tokens with at least some of the one or more second tokens based on a specified edit distance function relationship between the at least some of the one or more first tokens and the at least some of the one or more second tokens.

9. The system of claim 1, wherein the search results analysis component configured to determine an overall similarity score based at least partially on the one or more connection similarity scores comprises:
a search results analysis component configured to determine an overall similarity score by applying a token-weighted cosine similarity function to the one or more connection similarity scores.

10. The system of claim 1, wherein the search results analysis component is further configured to:
disregard one or more connection similarity scores that do not meet or exceed a specified threshold.

11. The system of claim 1, wherein the search results analysis component is further configured to:
assign first token weights to the one or more first tokens and second token weights to the one or more second tokens; and
wherein the overall similarity score is determined based at least partially on the one or more connection similarity scores and at least partially on the one or more first token weights and the one or more second token weights.

12. The system of claim 11, wherein the search results analysis component configured to determine an overall similarity score based at least partially on the one or more connection similarity scores and at least partially on the token weights comprises:
a search results analysis component configured to determine an overall similarity score by applying a token-weighted cosine similarity function to the one or more connection similarity scores and the one or more first token weights and the one or more second token weights.

13. A system for providing images for search queries, comprising a processor and executable instructions that, when executed by the processor, implement:
a query component configured to receive a search query, the search query including textual information associated with an entity of interest;
an external image retrieval component configured to conduct a search for one or more images associated with the search query via one or more networks;
a receiving component configured to receive a search result from the external image retrieval component, the search result including at least a search result image and image metadata associated with the search result image; and a search result analysis component configured to at least:
separate at least part of the image metadata associated with the search result image into one or more first tokens;
separate at least part of the textual information associated with the entity of interest into one or more second tokens;
apply one or more first token weights to the one or more first tokens;
apply one or more second token weights to the one or more second tokens;
compare at least some of the one or more first tokens with at least some of the one or more second tokens;
compute a connection similarity score associated with each comparison of the one or more first tokens with the one or more second tokens; and
compute the overall similarity score based at least partially on the one or more connection similarity scores, the one or more first token weights, and the one or more second token weights; and
determine whether to at least one of store, provide, or discard the search result image based at least partially on the determined similarity.

14. The system of claim 13, wherein the search result analysis component configured to determine a similarity between at least part of the image metadata associated with the search result image and at least part of the textual information associated with the entity of interest comprises:
a search result analysis component configured to compare one or more attributes of at least part of the image metadata with one or more attributes of at least part of the textual information associated with the entity of interest using a string distance function to determine an overall similarity score.

15. The system of claim 13, wherein the search result analysis component comprises:
a search result analysis component configured to apply a fuzzy distance-based machine learning model that determines a connection similarity score based on a combination of one or more edit distance aspects and one or more token-based aspects.

16. A system, comprising:
one or more processing devices;
one or more computer-readable media bearing instructions that, when executed by the one or more processing devices, configure the one or more processing devices to perform operations including at least:
conduct an electronic search via one or more networks to obtain search results based at least partially on a scrape query including at least textual information associated with an entity of interest, the search results including at least a search result image and image metadata associated with the search result image;
determine a similarity between at least part of the image metadata associated with the search result image and at least part of the textual information associated with the entity of interest, including at least:
tokenize the at least part of the image metadata associated with the search result image into one or more first tokens;
tokenize the at least part of the textual information associated with the entity of interest into one or more second tokens;
compare at least some of the one or more first tokens with at least some of the one or more second tokens;

determine a connection similarity score associated with each comparison of the one or more first tokens with the one or more second tokens; and determine an overall similarity score based at least partially on the one or more connection similarity scores; and determine whether to at least one of store, provide, or discard the search result image based at least partially on the determined similarity.

17. The system of claim 16, wherein the instructions further configure the one or more processing devices to provide a scrape query including textual information associated with an entity of interest.

18. The system of claim 16, wherein determine a similarity between at least part of the image metadata associated with the search result image and at least part of the textual information associated with the entity of interest comprises:

apply a machine learning model to determine a similarity based on a similarity between at least part of the image metadata associated with the search result image and at least part of the textual information associated with the entity of interest.

19. The system of claim 16, wherein determine a similarity between at least part of the image metadata associated with the search result image and at least part of the textual information associated with the entity of interest comprises:

apply a machine learning model to determine a similarity score based on a similarity between at least part of the image metadata associated with the search result image and at least part of the textual information associated with the entity of interest, the machine learning model being configured to determine the similarity by applying at least one of a fuzzy string distance function, a cosine string distance function, a Levenshtein string distance function, or a containment binary feature distance function.

20. The system of claim 16, wherein determine a similarity between at least part of the image metadata associated with the search result image and at least part of the textual information associated with the entity of interest comprises:

apply a machine learning model to determine a similarity score based on a similarity between at least part of the image metadata associated with the search result image and at least part of the textual information associated with the entity of interest, the machine learning model being configured to apply a fuzzy distance-based machine learning model that determines a connection similarity score based on a combination of one or more edit distance aspects and one or more token-based aspects.

* * * * *